UNITED STATES PATENT OFFICE.

CHARLES J. McLENNAN, OF DETROIT, MICHIGAN.

PAINT COMPOUND.

No. 872,960.     Specification of Letters Patent.     Patented Dec. 3, 1907.

Application filed September 9, 1907. Serial No. 391,904.

*To all whom it may concern:*

Be it known that I, CHARLES J. McLENNAN, a citizen of the United States, residing at Detroit, county of Wayne, State of Michigan, have invented a certain new and useful Improvement in Paint Compounds, and declare the following specification to be a full, clear, and exact description of the same, such as will enable others skilled in the art to which it pertains to make and use the same.

This invention relates to paint; it has for its object an improved combination of substances to be used as a paint for the preservation or ornamental coating of articles of wood, or other material with which such coatings are commonly and usually used.

The combination of materials is as follows:—one-half pint of bichromate of soda; three pints solution of silicate of soda; twelve pints of water; one pint of linseed oil; one-half pound of glue, and approximately five pounds of pigment.

The amount of the pigment varies somewhat, dependent upon the specific gravity thereof, as the liquid constituents will suffice for a larger weight for an article of greater specific gravity, and will suffice for a less amount in weight for an article of less specific gravity.

In compounding the paint, I first mix the silicate of soda solution with about one-half of the water, then add the linseed oil with active agitation thereby breaking up the oil globules, and emulsifying the same. I then add the bichromate of soda, which has been previously dissolved in about one-quarter of the water; the two solutions are then thoroughly mixed; next the glue, dissolved in the remainder of the water, is added, and thoroughly mixed. I then add the desired pigment, such as carbonate of lime, barytes, china clay, Venetian red, French gray, yellow ochre, or any suitable pigment.

The action of chromic acid and bichromates in forming insoluble compounds in gelatin is well known, but in carrying out this invention the neutral chromate is formed by combining the acid chromate with sodium of the silicate, by this combination also some of the silicate is set free as silicic acid, but the silicic acid is not precipitated, but remains in the colloid form in solution; in time this would separate and agglutinate as gelatinous hydrated silicate, were it not for the presence of the oily globules, which retard or prevent such molecular action; the oil also aids in forming the insoluble chromium gelatin combination by absorbing a portion of the available oxygen from the chromate on exposure to the light, reducing it (the chromate) to a lower state of oxidation, thus enabling it to unite with the gelatin. Other oils capable of absorbing oxygen and drying may be used in place of linseed oil, such as rape seed, china wood oil, etc., but I prefer linseed oil. So also other bichromates as bichromate of potash could be used, but the sodium chromate is the most available at the present time.

What I claim is:—

A paint, composed of bichromate of soda, silicate of soda, linseed oil, glue, water, and pigment in substantially the proportion specified.

In testimony whereof, I sign this specification in the presence of two witnesses.

CHARLES J. McLENNAN.

Witnesses:
ALICE TOWNSEND,
ELLIOTT J. STODDARD.